(12) United States Patent
Federico Nora

(10) Patent No.: US 11,506,270 B1
(45) Date of Patent: Nov. 22, 2022

(54) FLYWHEEL LOCK

(71) Applicant: Francisco Javier Federico Nora, Estes Park, CO (US)

(72) Inventor: Francisco Javier Federico Nora, Estes Park, CO (US)

( * ) Notice: Subject to any disclaimer, the term of this patent is extended or adjusted under 35 U.S.C. 154(b) by 494 days.

(21) Appl. No.: 16/813,500

(22) Filed: Mar. 9, 2020

Related U.S. Application Data

(60) Provisional application No. 62/815,750, filed on Mar. 8, 2019.

(51) Int. Cl.
*F16H 33/02* (2006.01)
*F16F 15/30* (2006.01)

(52) U.S. Cl.
CPC ............. *F16H 33/02* (2013.01); *F16F 15/30* (2013.01); *F16F 2230/0041* (2013.01)

(58) Field of Classification Search
CPC .... F16H 33/02; F16F 15/30; F16F 2230/0041
See application file for complete search history.

(56) References Cited

U.S. PATENT DOCUMENTS

| | | | | |
|---|---|---|---|---|
| 477,324 | A * | 6/1892 | Coburn | F16F 15/30 74/451 |
| 1,434,515 | A * | 11/1922 | Watson | B60R 25/007 70/237 |
| 1,523,086 | A * | 1/1925 | Schutza | B60R 25/007 70/237 |
| 8,869,650 | B1 * | 10/2014 | Harris | F16F 15/30 188/18 R |
| D777,555 | S * | 1/2017 | Owens | D8/343 |
| D887,799 | S * | 6/2020 | Federico Nora | D8/14 |
| 2011/0185842 | A1 * | 8/2011 | Whitehead | G05G 5/06 74/527 |

* cited by examiner

*Primary Examiner* — Terence Boes
(74) *Attorney, Agent, or Firm* — Nguyen Tarbet LLC

(57) ABSTRACT

A universal flywheel locking device which is configured to fit flywheels with a variety of sizes and tooth patterns. The device may feature an arched locking member and two guide members attached to the sides of the locking member. The locking member is configured to wedge the device between a fixed feature or bolt and a flywheel so as to prevent rotation of the flywheel. The first end of the locking member may be configured to fit within a gap between two of a plurality of teeth of the flywheel so as to lock the flywheel.

20 Claims, 4 Drawing Sheets

FLYWHEEL LOCK

CROSS-REFERENCES TO RELATED APPLICATIONS

Figure 1:
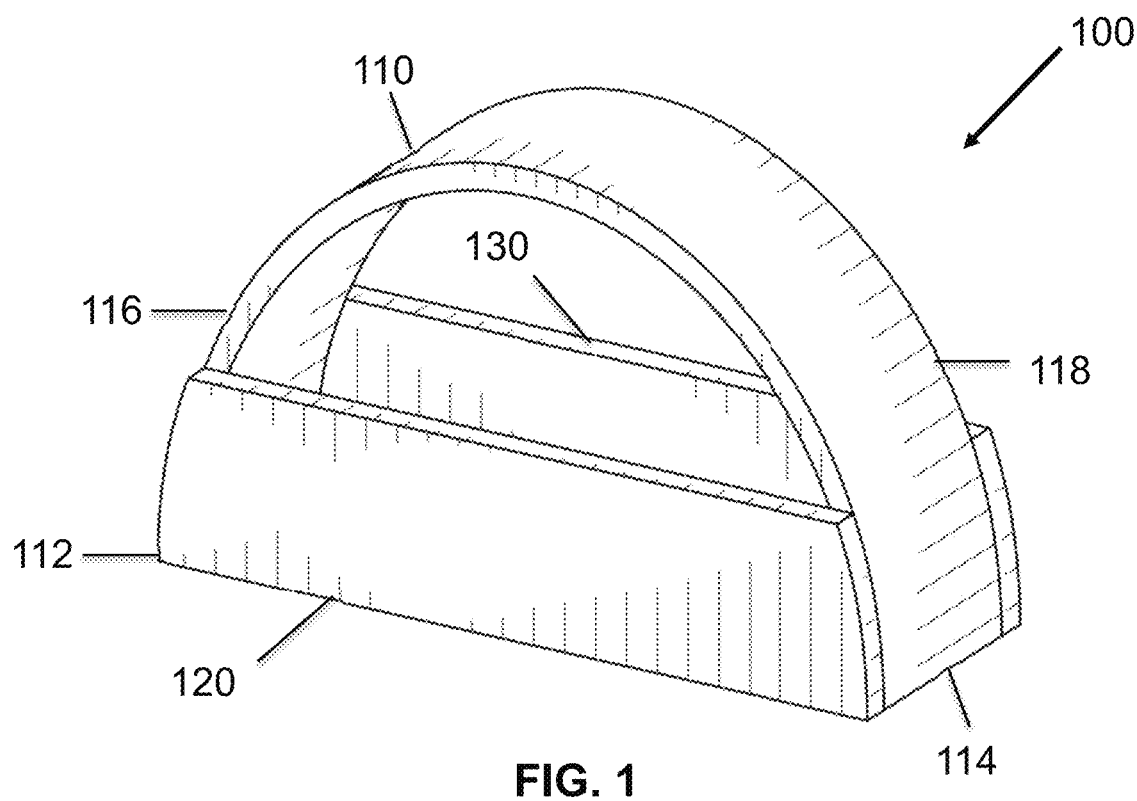

This application is a non-provisional and claims benefit of U.S. Provisional Application No. 62/815,750 filed Mar. 8, 2019, the specification of which is incorporated herein in its entirety by reference.

FIELD OF THE INVENTION

The present invention relates to locking devices for hindering the rotation of a gear. More specifically, the present invention relates to locking devices for locking a flywheel of an internal combustion engine.

BACKGROUND OF THE INVENTION

The flywheel is an integral part of the internal combustion engine. It is connected to the crankshaft of the engine and helps to balance the rotating crankshaft. Power can be transferred through the flywheel from the engine to the transmission. The circumference of the flywheel generally features teeth which engage with the starter motor.

In the course of engine maintenance or repair, it is sometimes necessary to tighten or loosen the bolts or nuts which hold the flywheel in place. Because of the importance of the flywheel, the fixing bolts or nuts may require large amounts of torque to rotate. In order to prevent the flywheel from rotating when torque is applied to the fixing nuts or bolts, it may be desirable to lock the flywheel in place.

Flywheel locks have been designed with teeth which are complementary to the teeth of the flywheel. Some flywheel locks have teeth patterns such that the teeth of the flywheel lock are configured to fit perfectly between the teeth of the flywheel. While this configuration has the advantage of ensuring a secure fit between the flywheel and the locking device, it requires that a different flywheel be engineered for each different flywheel configuration. As there are a variety of sizes and tooth patterns which are used in flywheel design, a large assortment of flywheel locks is needed to allow for locking of the different flywheels.

In addition to interfacing with the flywheel, locking devices must also interface with some fixed part of the surroundings so that the locking devices do not rotate along with the flywheel. Given the variety of drivetrain shapes and configurations, there are many different fixed parts to which locking devices could be connected. Typically, flywheel locking devices are fixedly attached in place by attachment with of a preexisting bolt. For example, flywheel locking devices have been designed with an arm with a hole for a bolt to pass through and fasten the device in place. As the position of bolts in the vicinity of the flywheel varies in different automotive systems, each configuration requires a different arm shape and length in order to hold the device in the correct position.

BRIEF SUMMARY OF THE INVENTION

The present invention features a universal flywheel locking device which is configured to engage with the teeth of a variety of flywheels so as to prevent the flywheels from rotating.

One of the unique and inventive technical features of the present invention is that the device is configured to fit over the teeth of the flywheel and engage with the teeth at only two points. Without wishing to limit the invention to any theory or mechanism, it is believed that the technical feature of the present invention advantageously provides for the device to interface with multiple flywheels which have different sizes, curvatures, and tooth patterns. None of the presently known prior references or work has the unique inventive technical feature of the present invention.

Because the present device does not interface with a long section of the teeth, there is no need to match the specific tooth patterning. Instead, one end of the device is pressed into the gap between two teeth so as to hold the flywheel in place. The opposite end of the device also contacts the teeth of the flywheel but does not need to fit at any particular part of the tooth pattern. For example, the second end does not need to fit exactly in a gap between two teeth but may instead contact a side of one of the teeth. This second contact point may serve to hold the device in the proper orientation so that the first end of the device solidly engages with the teeth and may also provide support for the device to be wedged in place. This design eliminates the need for a specific distance between the two ends of the device based on the tooth pattern and allows a single device to interface with a variety of flywheel configurations.

The device of the present invention does not feature an arm with a hole for a bolt to go through but rather an arched locking member. The arched locking member allows the device to be wedged between the flywheel and a fixed feature or bolt without having been actually bolted in place. Because of the shape of the arched locking member, the device can work with a variety of configurations in which the fixed feature or bolt has varying distance from the flywheel. This allows for universal use of the device with a variety of different engine configurations. Additionally, because the device does not need to be bolted in place, the nearby bolt does not need to be removed and passed through the device. This difference from the prior art allows for the device of the present invention to be installed and remove much more quickly and conveniently than previously developed flywheel locking devices.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

Figure 2:
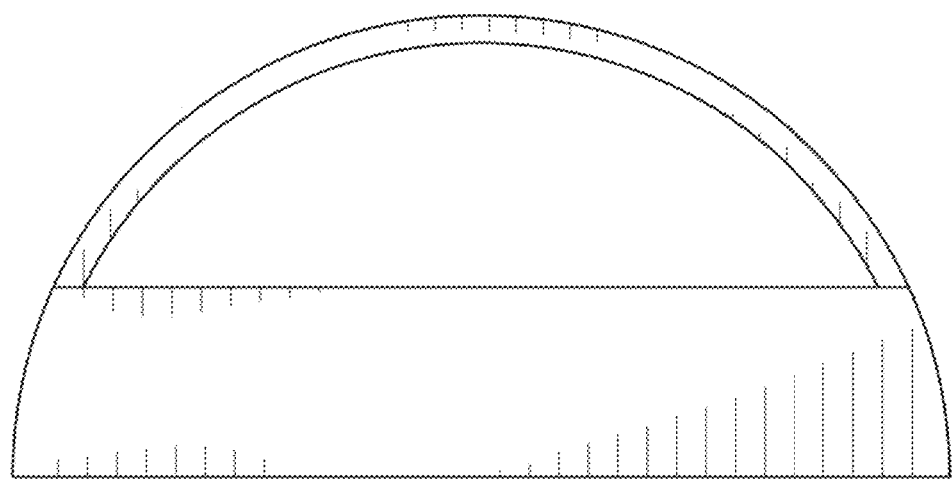
Figure 3:
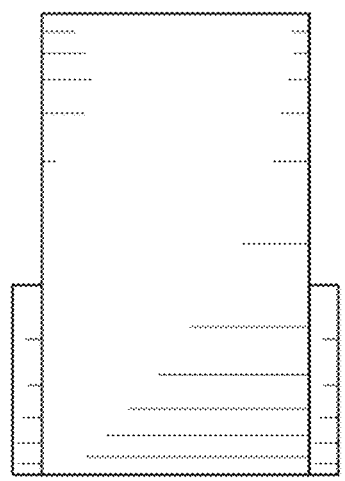
Figure 4:
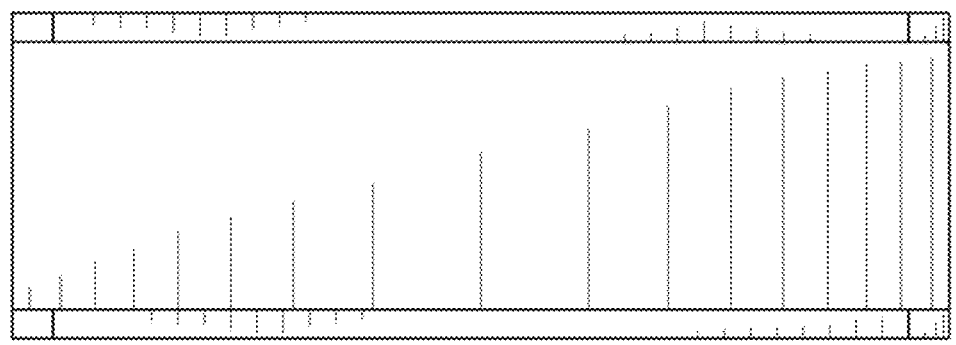
Figure 5:
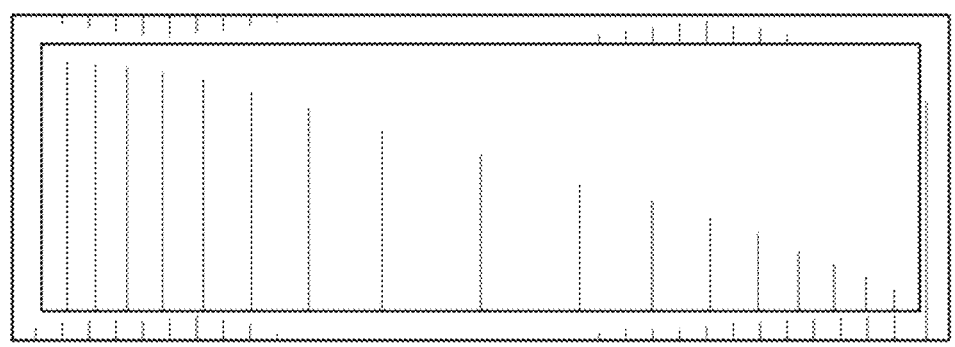
Figure 6:
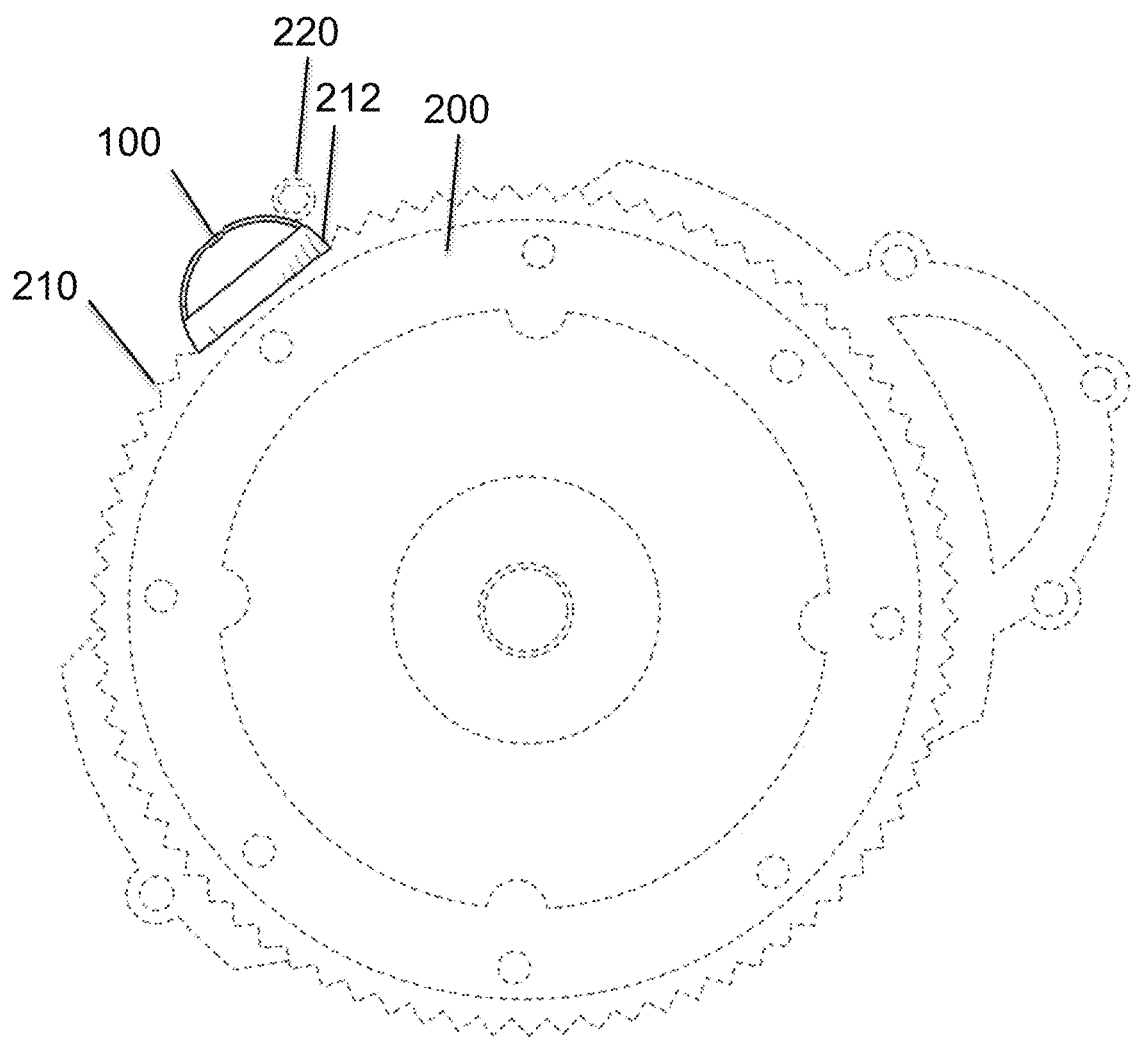
Figure 7:
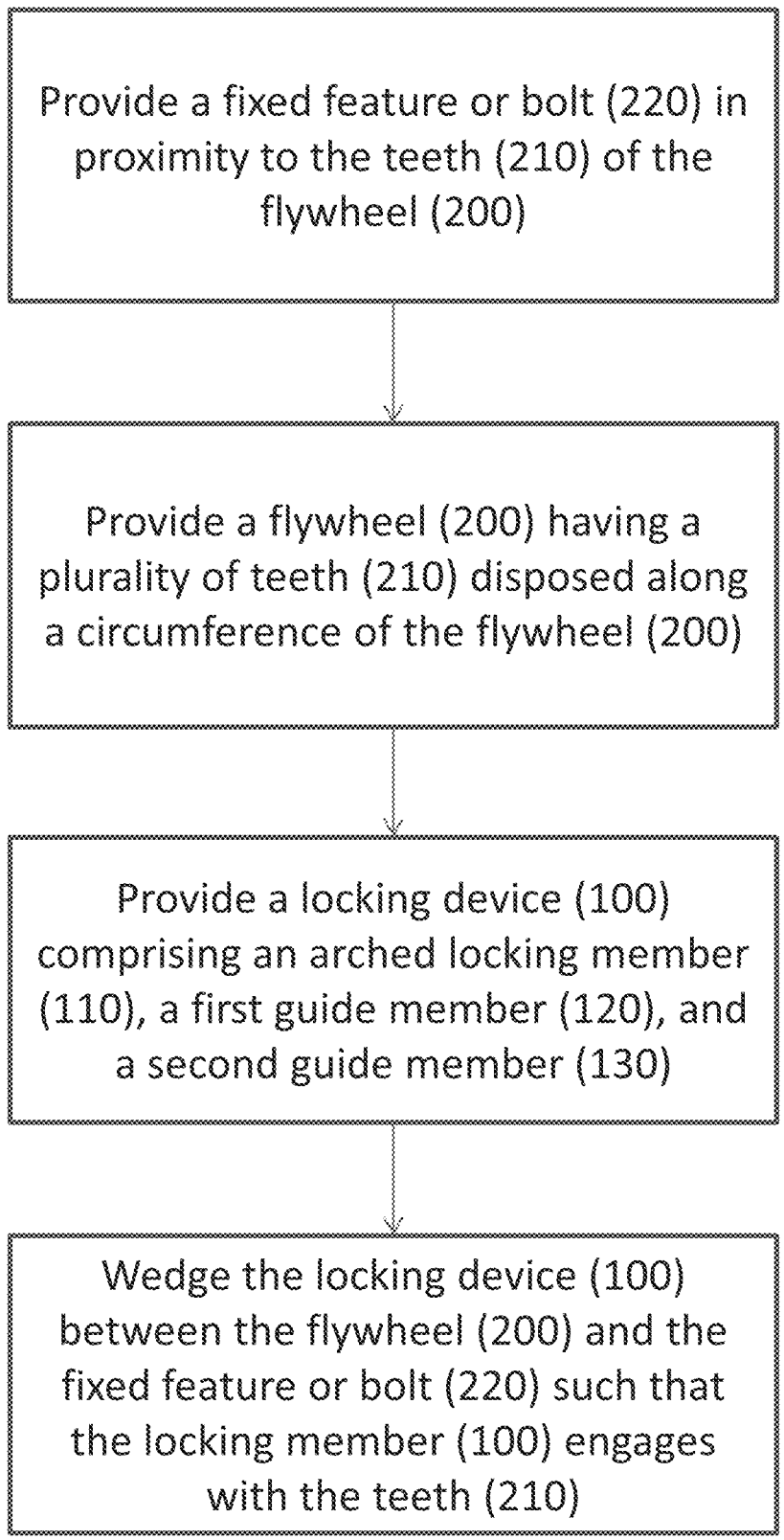

The features and advantages of the present invention will become apparent from a consideration of the following detailed description presented in connection with the accompanying drawings in which:

FIG. 1 shows a perspective view of the flywheel lock.
FIG. 2 shows a front or back view of the flywheel lock.
FIG. 3 shows a side view of the flywheel lock.
FIG. 4 shows a top view of the flywheel lock.
FIG. 5 shows a bottom view of the flywheel lock.
FIG. 6 shows an illustration of the flywheel lock in use, locking a flywheel.
FIG. 7 shows a flow chart of a method of applying the flywheel lock.

DETAILED DESCRIPTION OF THE INVENTION

Following is a list of elements corresponding to a particular element referred to herein:

100 flywheel locking device
110 locking member
112 first end
114 second end
116 first side
118 second side
120 first guide member
130 second guide member
200 flywheel
210 teeth
212 gap
220 bolt Referring now to FIG. 1, the present invention features a flywheel locking device (100). In one embodiment, the flywheel locking device (100) may comprising an arched locking member (110), a first guide member (120), and a second guide member (130). In some embodiments, the arched locking member (110) may have a first end (112) and a second end (114). In further embodiments, the first guide member (120) may be attached to a first side (116) of the locking member (110) between the first end (112) and the second end (114). In yet further embodiments, the second guide member (130) may be attached to a second side (118) of the locking member (110) between the first end (112) and the second end (114). In yet further embodiments, the locking member (110) may be configured to wedge the device (100) between a fixed feature or bolt (220) and a flywheel (200). As a non-limiting example, the first end (112) of the locking member (110) may be configured to fit within a gap (212) between two of a plurality of teeth (210) of the flywheel so as to lock the flywheel (210).

In an embodiment, the second end (114) of the locking member (110) may be configured to contact the teeth (210) of the flywheel (200) so as to position the device (100) against the flywheel (200). In another embodiment, the second end (114) of the locking member (110) also engages with the plurality of teeth (210). In still another embodiment, the locking member (110) may be configured to wedge the device (100) such that attempted rotation of the flywheel (200) would increase a force directing the first end (112) of the locking member (110) into the gap (212).

In some embodiments, the device (100) may comprise a single solid unit. As a non-limiting example, the single solid unit may have been machined from a solid block of material. In other embodiments, the device (100) may comprise multiple subunits which have been fixed together. As a non-limiting example, the subunits may have been welded together. In some embodiments, the device (100) may comprise a metal or a hard plastic.

According to one embodiment, the first (120) and second (130) guide members may be configured to fit on either side of the teeth (210) of the flywheel (200). According to another embodiment, the first (120) and second (130) guide members may be configured to prevent the device (100) from moving away from a plane of the flywheel (200). In one embodiment, the plane may bisect all of the teeth (210) of the flywheel (200). In some embodiments, the first (120) and second (130) guide members may reinforce the locking member (110) so as to prevent the locking member (110) from distortion or damage. In other embodiments, the first (120) and second (130) guide members may each comprise a flat plate.

In a selected embodiment, the device (100) may be configured to lock the flywheel (200) so as to prevent rotation in one or both directions. In another embodiment, the device (100) may be configured to accommodate a variety of flywheels (200) with different radii, tooth shape, and tooth spacing. In yet another embodiment, the locking member (110) may comprise a semi-circular or semi-ovaloid shape. In still another embodiment, the locking member (110) may comprise a curved plate.

Referring to FIG. 6, the present invention features a flywheel locking system. As a non-limiting example, the system may comprise: a flywheel (200), a bolt (220), and a flywheel locking device (100). In one embodiment, the flywheel (200) may have a plurality of teeth (210) disposed along a circumference of the flywheel (200). In another embodiment, the bolt (220) may be fixedly attached in proximity to the circumference of the flywheel (200). In still another embodiment, the flywheel locking device (100) may comprise: an arched locking member (110) having a first end (112) and a second end (114); a first guide member (120) attached to a first side (116) of the locking member (110) between the first end (112) and the second end (114); and a second guide member (130) attached to a second side (118) of the locking member (110) between the first end (112) and the second end (114).

In a preferred embodiment, the device (100) may be configured to be wedged between the flywheel (200) and the bolt (220) such that the first end (112) of the locking member (110) engages with the teeth (210) of the flywheel (200) and locks the flywheel (200). In another embodiment, locking the flywheel (200) with the device (100) may prevent rotation of the flywheel (200) in one or both directions. In other embodiments, the first end (112) of the locking member (110) may be configured to fit within a gap (212) between two of a plurality of teeth (210) of the flywheel (200) so as to lock the flywheel (200).

Referring to FIG. 7, the present invention features a method of locking a flywheel (200). As a non-limiting example, the method may comprise: providing a flywheel (200) having a plurality of teeth (210) disposed along a circumference of the flywheel (200); providing a fixed feature or bolt (220) in proximity to the teeth (210) of the flywheel (200); providing a locking device (100); and wedging the locking device (100) between the flywheel (200) and the fixed feature or bolt (220) such that a first end (112) of a locking member (110) of the device (100) engages with the teeth (210) of the flywheel (200) and locks the flywheel (200). In some embodiments, the locking device (100) may comprise: an arched locking member (110) having a first end (112) and a second end (114); a first guide member (120) attached to a first side (116) of the locking member (110) between the first end (112) and the second end (114); and a second guide member (130) attached to a second side (118) of the locking member (110) between the first end (112) and the second end (114). In some further embodiments, the first end (112) of the locking member (110) may be configured to fit within a gap (212) between two of a plurality of teeth (210) of the flywheel (200) so as to lock the flywheel (200).

In an exemplary embodiment, the present invention features a flywheel locking device (100). The device (100) may consist of an arched locking member (110) having a first end (112) and a second end (114). The device (100) may further consist of a first guide member (120) attached to a first side (116) of the locking member (110) between the first end (112) and the second end (114), and a second guide member (130) attached to a second side (118) of the locking member (110) between the first end (112) and the second end (114). In the exemplary embodiment, the locking member (110) consists of a curved plate and is configured to wedge the device (100) between a fixed feature or bolt (220) and a flywheel (200). The first end (112) of the locking member (110) is configured to fit within a gap (212) between two of a plurality of teeth (210) of the flywheel (200) so as to lock the flywheel (200), and the second end (114) of the locking member (110) is configured to contact the teeth (210) of the flywheel (200) so as to position the device (100) against the flywheel (200). In the exemplary embodiment, the first guide member (120) and the second guide member (130) each consist of a flat plate and are positioned on either side of the plurality of teeth (210) of the flywheel (200) so as to keep the locking device (100) from moving away from a plane that bisects all of the teeth (210) of the flywheel (200).

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A flywheel locking system, the system comprising:
   a. a flywheel (200) having a plurality of teeth (210) disposed along a circumference of the flywheel (200);
   b. a bolt (220) fixedly attached in proximity to the circumference of the flywheel (200); and
   c. a flywheel locking device (100), comprising:
      i. an arched locking member (110) having a first end (112) and a second end (114);
      ii. a first guide member (120) attached to a first side (116) of the locking member (110) between the first end (112) and the second end (114); and
      iii. a second guide member (130) attached to a second side (118) of the locking member (110) between the first end (112) and the second end (114);
      wherein the device (100) is configured to be wedged between the flywheel (200) and the bolt (220) such that the first end (112) of the locking member (110) engages with the teeth (210) of the flywheel (200) and locks the flywheel (200).

2. The system of claim 1, wherein locking the flywheel (200) with the device (100) prevents rotation of the flywheel (200) in one or both directions.

3. The system of claim 1, wherein the first end (112) of the locking member (110) is configured to fit within a gap (212) between two of a plurality of teeth (210) of the flywheel (200) so as to lock the flywheel (200).

4. A flywheel locking device (100), comprising:
   a. an arched locking member (110) having a first end (112) and a second end (114);
   b. a first guide member (120) attached to a first side (116) of the locking member (110) between the first end (112) and the second end (114); and
   c. a second guide member (130) attached to a second side (118) of the locking member (110) between the first end (112) and the second end (114);
      wherein the locking member (110) is configured to wedge the device (100) between a fixed feature or bolt (220) and a flywheel (200), and
      wherein the first end (112) of the locking member (110) is configured to fit within a gap (212) between two of a plurality of teeth (210) of the flywheel so as to lock the flywheel (210).

5. The device of claim 4, wherein the second end (114) of the locking member (110) is configured to contact the teeth (210) of the flywheel (200) so as to position the device (100) against the flywheel (200).

6. The device of claim 4, wherein the second end (114) of the locking member (110) also engages with the plurality of teeth (210).

7. The device of claim 4, wherein the locking member (110) is configured to wedge the device (100) such that attempted rotation of the flywheel (200) would increase a force directing the first end (112) of the locking member (110) into the gap (212).

8. The device of claim 4, wherein the device (100) comprises a single solid unit machined from a solid block of material.

9. The device of claim 8, wherein the single solid unit has been machined from a solid block of material.

10. The device of claim 4, wherein the device (100) comprises multiple subunits which have been fixed together.

11. The device of claim 10, wherein the subunits have been welded together.

12. The device of claim 4, wherein the device (100) comprises a metal or a hard plastic.

13. The device of claim 4, wherein the first (120) and second (130) guide members are configured to fit on either side of the teeth (210) of the flywheel (200).

14. The device of claim 13, wherein the first (120) and second (130) guide members are configured to prevent the device (100) from moving away from a plane of the flywheel (200).

15. The device of claim 14, wherein the plane bisects all of the teeth (210) of the flywheel (200).

16. The device of claim 4, wherein the device (100) is configured to accommodate a variety of flywheels (200) with different radii, tooth shape, and tooth spacing.

17. The device of claim 4, wherein the first (120) and second (130) guide members reinforce the locking member (110) so as to prevent the locking member (110) from distortion or damage.

18. The device of claim 4, wherein the first (120) and second (130) guide members each comprise a flat plate.

19. The device of claim 4, wherein the locking member (110) comprises a curved plate.

20. A flywheel locking device (100), consisting:
   a. an arched locking member (110) having a first end (112) and a second end (114);
   b. a first guide member (120) attached to a first side (116) of the locking member (110) between the first end (112) and the second end (114); and c. a second guide member (130) attached to a second side (118) of the locking member (110) between the first end (112) and the second end (114);

wherein the locking member (110) is configured to wedge the device (100) between a fixed feature or bolt (220) and a flywheel (200), wherein the locking member (110) consists of a curved plate, wherein the first end (112) of the locking member (110) is configured to fit within a gap (212) between two of a plurality of teeth (210) of the flywheel (200) so as to lock the flywheel (200), wherein the second end (114) of the locking member (110) is configured to contact the teeth (210) of the flywheel (200) so as to position the device (100) against the flywheel (200), wherein the first guide member (120) and the second guide member (130) are positioned on either side of the plurality of teeth (210) of the flywheel (200) so as to keep the locking device (100) from moving away from a plane of the flywheel (200), wherein the first guide member (120) consists of a flat plate, wherein the second guide member (130) consists of a flat plate, and wherein the plane bisects all of the teeth (210) of the flywheel (200).

\* \* \* \* \*